United States Patent
Tashiro

(10) Patent No.: US 12,165,787 B2
(45) Date of Patent: Dec. 10, 2024

(54) TWISTED WIRE AND CABLE INCLUDING THE SAME

(71) Applicant: Yazaki Corporation, Tokyo (JP)

(72) Inventor: Kosuke Tashiro, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 317 days.

(21) Appl. No.: 17/493,122

(22) Filed: Oct. 4, 2021

(65) Prior Publication Data

US 2022/0108815 A1 Apr. 7, 2022

(30) Foreign Application Priority Data

Oct. 5, 2020 (JP) ................ 2020-168412

(51) Int. Cl.
*H01B 3/30* (2006.01)
*H01B 11/02* (2006.01)

(52) U.S. Cl.
CPC .............. *H01B 3/30* (2013.01); *H01B 11/02* (2013.01)

(58) Field of Classification Search
None
See application file for complete search history.

(56) References Cited

U.S. PATENT DOCUMENTS

| 2007/0037910 A1* | 2/2007 | Murakami | C08L 23/10 524/323 |
| 2010/0163272 A1* | 7/2010 | Inagaki | H01B 3/44 174/110 SR |
| 2011/0056728 A1* | 3/2011 | Shiraki | C08J 3/20 174/110 SR |

FOREIGN PATENT DOCUMENTS

| CN | 107868345 A | 4/2018 |
| JP | 2008-130347 A | 6/2008 |
| JP | 2012119196 | * 6/2012 |
| WO | WO2019198403 | * 10/2019 |

OTHER PUBLICATIONS

Machine translation of JP2012119196 (Year: 2012).*
Machine translation of JP2008130347 (Year: 2008).*
Machine Translation of WO2019198403 (Year: 2019).*

* cited by examiner

*Primary Examiner* — Shawn Mckinnon
(74) *Attorney, Agent, or Firm* — Sughrue Mion, PLLC

(57) ABSTRACT

A twisted pair cable is a twisted pair cable obtained by twisting two electric wires each of which includes a conductor portion and an insulator covering an outer periphery of the conductor portion. The insulator is made of a resin composition containing polypropylene, an antioxidant, and a copper inhibitor. The insulator has an external appearance abnormality development time exceeding 3,000 hours during a test of compatibility with PVC in contact with PVC at 100° C. The insulator has a relative dielectric constant of 2.0 to 2.5 and a dielectric dissipation factor of $1.0 \times 10^{-3}$ or less when m electric field having a frequency of 1 GHz is applied.

2 Claims, 3 Drawing Sheets

TWISTED WIRE AND CABLE INCLUDING THE SAME

CROSS-REFERANCE TO RELATED APPLICATIONS

The present application is based on, and claims priority from the prior Japanese Patent Application No. 2020-168412, filed on Oct. 5, 2020, the entire contents of which are incorporated herein by reference.

TECHNICAL FIELD

The present disclosure relates to a twisted pair cable and a cable including the same.

BACKGROUND

Advanced electrical information communication is required for, for example, automatic drive of an automobile. Thus, for the purpose of increasing a transmission speed during differential transmission, it has been examined to use an onboard transmission cable that includes a twisted pair cable obtained by twisting two electric wires and is covered with a sheath. In recent years, it has been attempted to reduce a transmission loss in the onboard transmission cable in view of increasing a transmission speed.

A transmission loss in the transmission cable is increased in proportion to a dielectric constant and a dielectric dissipation factor of an insulator of each of the electric wires constituting the twisted pair cable. Thus, it is desired that, in the onboard transmission cable, the dielectric constant and the dielectric dissipation factor of the insulator of the electric wire be reduced.

Further, the onboard transmission cable is expected to maintain communication performance securely for a long time period even under a severe onboard environment. For example, in some cases, the onboard transmission cable is exposed under a high temperature of 100° C. or higher for a long time period. Thus, it is desired that the onboard electric wire of the onboard transmission cable sufficiently satisfy heat resistance at overload defined by the standard (ISO 6722 CLASS B). For example, it is desired that the insulator of each of the electric wires constituting the onboard transmission cable have a inciting point of 150° C. or higher.

Note that pure copper, a copper alloy, or the like is normally used as a conductor of the electric wire. However, copper causes degradation of the insulator of the electric wire, that is, copper damage in some cases. Thus, a copper inhibitor is normally added to a resin constituting the insulator of the electric wire. Further, in addition to a copper inhibitor, an antioxidant is also added to the resin constituting the insulator of the electric wire.

On the other hand, Patent Literature 1 (Japanese Unexamined Patent Application Publication No. 2008-130347) discloses a twisted pair cable with a shield, the twisted pair cable being obtained by twisting a plurality of insulating core wires each of which has a conductor and an insulator covering an outer periphery of the conductor, and covering an outer periphery of the twisted insulating core wires with a sheath, the insulator having a relative dielectric constant of 2.0 to 2.3. Specifically, an insulator containing polypropylene and ultra-low density polyethylene is used as the insulator in Patent Literature 1. Further, Patent Literature 1 discloses that an antioxidant, a copper inhibitor, and the like are added to a resin constituting the insulator of the electric wire.

SUMMARY

However, an antioxidant and a copper inhibitor normally have a high dielectric constant and a high dielectric dissipation factor as compared to the resin constituting the insulator of the electric wire. Thus, Patent Literature 1 does not disclose the twisted pair cable that achieves a low dielectric constant and a low dielectric dissipation factor of the insulator in a compatible manner.

Further, the insulator of the twisted pair cable with a shield disclosed in Patent Literature 1 generally contains a large amount of polyethylene having a low melting point from 90° C. to 140° C. Thus, there may be a risk that the twisted pair cable with a shield disclosed in Patent Literature 1 cannot sufficiently satisfy heat resistance at overload defined by ISO 6722 CLASS B. Note that, when a cross-linking degree of polyethylene is increased, a melting point of polyethylene is expected to be higher. However, cross-linked polyethylene tends to have a high dielectric dissipation factor at a high temperature.

Further, when the onboard transmission cable is used for, for example, automatic drive, it is assumed that the transmission cable is used in a bundled state with another wire harness. In many cases, polyvinyl chloride (PVC) is used as an insulator of each of electric wires constituting the other wire harness.

PVC constituting the insulator of the electric wire normally contains a plasticizer. Thus, when the onboard transmission cable and the other wire harness are bundled together, the plasticizer contained in the insulator of the other wire harness bleeds out, and moves to the sheath of the onboard transmission cable and the insulator of the electric wire in the sheath in some cases. When the plasticizer moves to the sheath and the insulator of the electric wire, the sheath of the onboard transmission cable, the insulator of the electric wire, and the like tend to be degraded.

Thus, there have not been known hitherto an onboard transmission cable and an electric wire included therein, the onboard transmission cable using a conductor containing copper that achieves a low dielectric constant and a low dielectric dissipation factor in a compatible manner and has long heat resistant life under an environment in contact with PVC.

The present disclosure has been achieved in view of the above-mentioned problems in the related-art technique. It is an object of the present disclosure to provide a twisted pair cable and a cable including the same, the twisted pair cable including an insulator that has a low dielectric constant and a low dielectric dissipation factor and has long heat resistant life even in contact with PVC.

A twisted pair cable according to an embodiment is a twisted pair cable obtained by twisting two electric wires each of which includes a conductor portion and an insulator covering an outer periphery of the conductor portion. The insulator is made of a resin composition containing polypropylene, an antioxidant, and a copper inhibitor. The insulator has an external appearance abnormality development time exceeding 3,000 hours during a test of compatibility with PVC in contact with PVC at 100° C. The insulator has a relative dielectric constant of 2.0 to 2.5 and a dielectric dissipation factor of $1.0 \times 10^{-3}$ or less when an electric field having a frequency of 1 GHz is applied.

According to the configuration described above, there can be provided the twisted pair cable and the cable including the same, the twisted pair cable including the insulator, the insulator having a low dielectric constant, a low dielectric dissipation factor and long heat resistant life even in contact with PVC.

DETAILED DESCRIPTION

Various embodiments will be described hereinafter with reference to the accompanying drawings.

With reference to the drawings, a twisted pair cable and a cable including the same according to the present embodiment are described below in detail.

[Twisted Wire]

Figure 1:
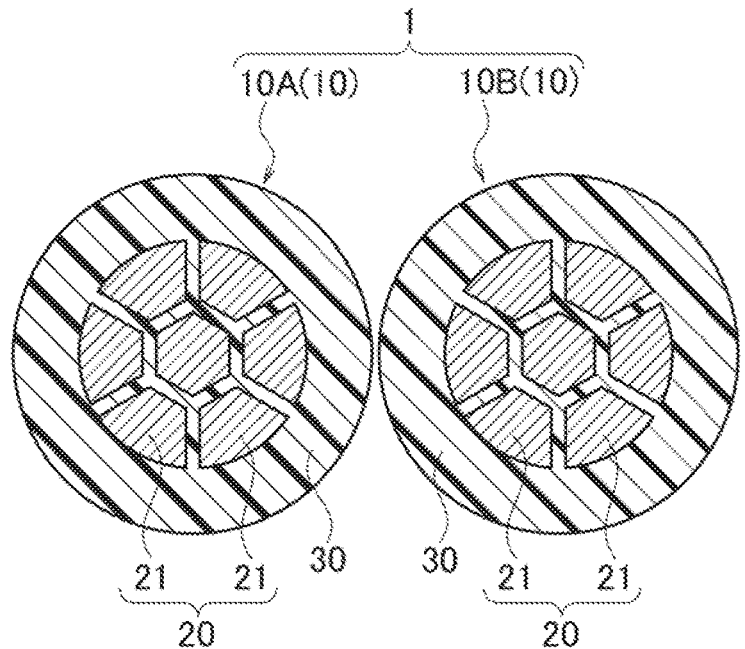
FIG. 1 is a cross-sectional view of a twisted pair cable according to an embodiment.

FIG. 1 is a cross-sectional view of a twisted pair cable according to the embodiment.

As illustrated in FIG. 1, a twisted pair cable 1 is obtained by twisting two electric wires 10 (10A, 10B) each of which includes a conductor portion 20 and an insulator 30 covering an outer periphery of the conductor portion 20. FIG. 1 is a cross-sectional view of the twisted pair cable 1, and hence a cross-section of the electric wire 10A and a cross-section of the electric wire 10B that are adjacent to each other are illustrated. Note that an external appearance of the twisted pair cable 1, which is not illustrated, has a twisted shape obtained by twisting the electric wire 10A and the electric wire 10B.

The electric wire 10A and the electric wire 10B constituting the twisted pair cable 1 have similar configurations. In the twisted pair cable 1, mutually-reversed phase currents flow through the electric wire 10A and the electric wire 10B. Thus, a potential difference between the electric wire 10A and the electric wire 10B allows transmission of a signal in the twisted pair cable 1.

The electric wires 10 (10A, 10B) constituting the twisted pair cable 1 are described below. The electric wire 10A and the electric wire 10B have similar configurations, and hence a conceptualized configuration is described based on the electric wires 10 including those configurations.

(Electric Wire)

As illustrated in FIG. 1, the electric wire 10A and 10B have similar configurations, and each include the conductor portion 20 and the insulator 30 covering the outer periphery of the conductor portion 20.

<Conductor>

The conductor portion 20 is a portion formed of conductors. The conductor portion 20 illustrated in FIG. 1 is a twisted wire formed by using seven single wire conductors 21 and performing pressing from the periphery. Note that, in a modification example, the conductor portion 20 may be a twisted wire formed of six or less, or eight or more single wire conductors 21, or may be a twisted wire that is not pressed from the periphery. Further, in another modification example of the conductor portion 20, a mode in which the conductor portion is formed only of one single wire conductor 21, a mode in which the conductor portion is formed of an assembly including a plurality of single wire conductors 21, or the like may be achieved.

When the conductor portion 20 is a twisted wire, a cross-sectional area sq value ($mm^2$) of the twisted conductor portion 20, which is a total value of cross-sectional areas of all the single wire conductors 21 in the electric wire 10, is 0.13 sq to 0.35 sq, for example, Copper, a copper alloy, or the like is used as a material of the conductor portion 20.

<Insulator>

The insulator 30 covers the outer periphery of the conductor portion 20. The insulator 30 is made of a resin composition. Specifically, the insulator 30 is obtained by curing the resin composition. The resin composition contains polypropylene, an antioxidant, and a copper inhibitor.

[Polypropylene]

As polypropylene, for example, homo polypropylene, block polypropylene, or random polypropylene is used.

Figure 4:
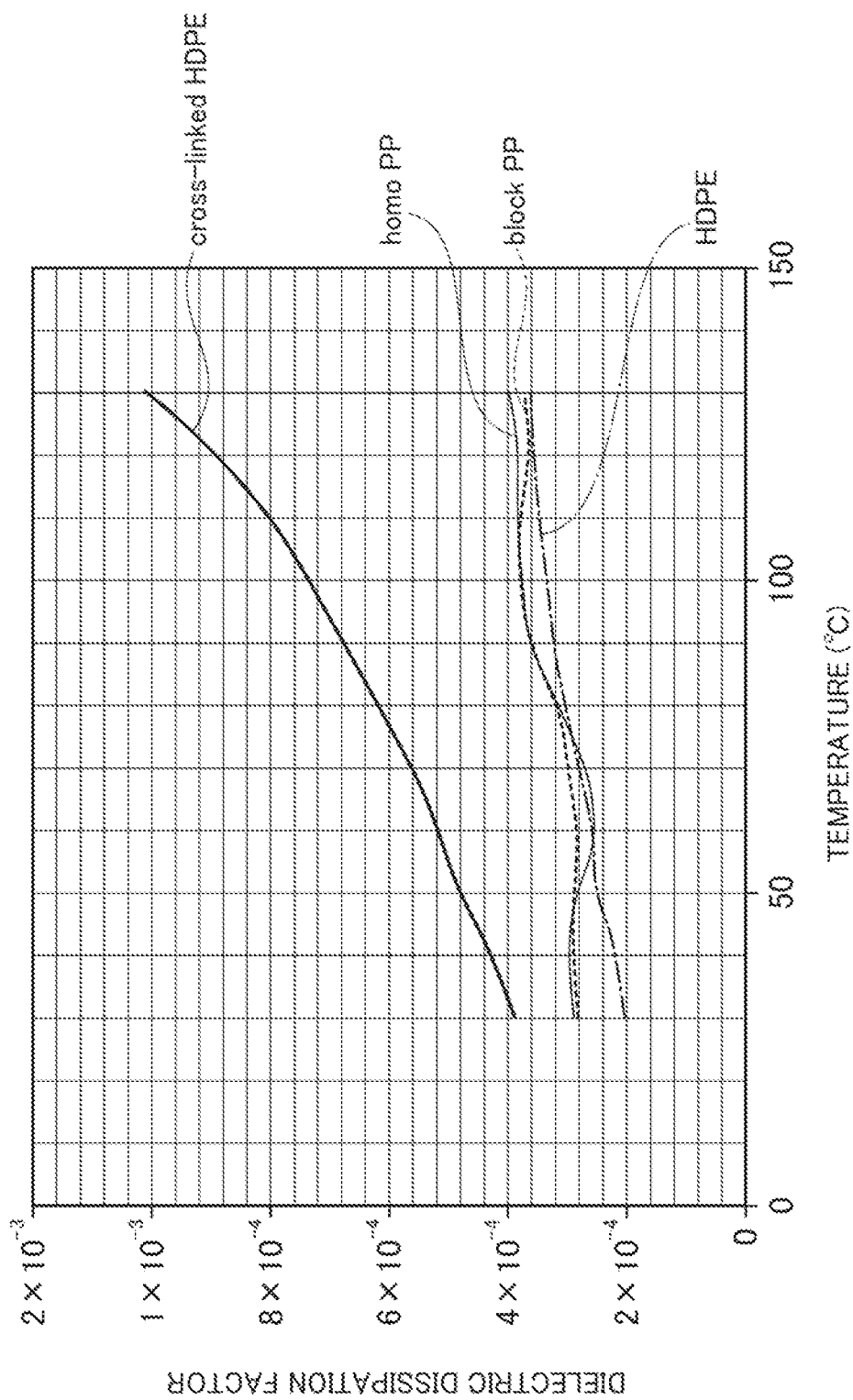
FIG. 4 is a graph illustrating a relationship between a resin type and a dielectric dissipation factor.

FIG. 4 is a graph illustrating a relationship between a resin type and a dielectric dissipation factor. Note that, in FIG. 4, the graph illustrates high density polyethylene (HDPE) and cross-linked HDPE in addition to homo polypropylene (homo PP) and block polypropylene (block PP).

As illustrated in FIG. 4, it can be understood that homo polypropylene and block polypropylene each have a low dielectric dissipation factor regardless of increase in temperature. On the other hand, in a case of HDPE, it can be understood that normal high density polyethylene (HDPE) having a low melting point has a low dielectric dissipation factor regardless of increase in temperature while cross-linked HDPE having an improved thermal deformation property has a higher dielectric dissipation factor as a temperature is increased. In this manner, polyethylene has a problem such as a low melting point, a higher dielectric dissipation factor as a temperature is increased, and the like. Thus, polypropylene having a low dielectric dissipation factor regardless of increase in temperature is used in the resin composition constituting the insulator 30 of the twisted pair cable 1 according to the embodiment.

[Antioxidant]

As the antioxidant, for example, a phenol-based antioxidant, a sulfur-based antioxidant, or a phosphite-based antioxidant is used. Among these, the phenol-based antioxidant is preferred because heat resistant life of the insulator 30 is prolonged. Further, when the sulfur-based antioxidant, the phosphite-based antioxidant, or the like is used, the phenol-based antioxidant is preferably used in combination because heat resistant life of the insulator 30 is prolonged. Therefore, at least the phenol-based antioxidant is preferably used in the antioxidant because heat resistant life of the insulator 30 is prolonged.

As the phenol-based antioxidant, for example, antioxidants expressed in Formula (A1) and Formula (A2) given below are used.

[Chem. 1]

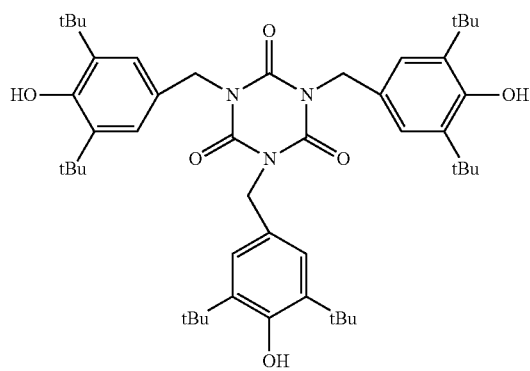

(A1)

1,3,5-tris(3,5-ditertiarybutyl-4-hydroxybenzyl)1,3,5-triazine-2,4,6(1H,3H,5H)-trione

[Chem. 2]

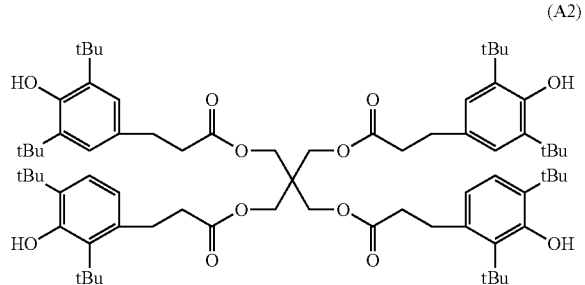

(A2)

pentaerythritoltetrakis[3-(3,5-ditertiarybutyl-4-hydroxyphenyl)propionate]

As the sulfur-based antioxidant, for example, an antioxidant expressed in Formula (A3) given below is used.

[Chem. 3]

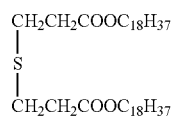

(A3)

distearyl thiodipropionate

As the phosphite-based antioxidant, for example, an antioxidant expressed in Formula (A4) given below is used.

[Chem. 4]

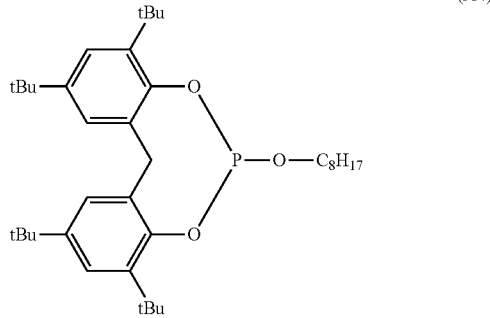

(A4)

2,2'-methylenebis(4,6,-ditertiarybutylphenyl)2-ethylhexylphosphite

[Copper Inhibitor]

As the copper inhibitor, for example, a salicylic acid-based copper inhibitor or a hydrazine-based copper inhibitor is used.

The copper inhibitor preferably contains 10 to 100 mass % of the salicylic acid-based copper inhibitor. The blending amount of the salicylic acid-based copper inhibitor in the entire copper inhibitor preferably falls within the range described above because heat resistant life of the insulator 30 is prolonged.

As the salicylic acid-based copper inhibitor, for example, a copper inhibitor expressed in Formula (B1) given below is used.

[Chem. 5]

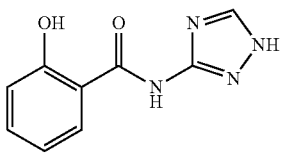

(B1)

2-hydroxy-N-1H-1,2,4-triazole-3-ylbenzamide

As the hydrazine-based copper inhibitor, for example, a copper inhibitor expressed in Formula (B2) given below is used.

[Chem. 6]

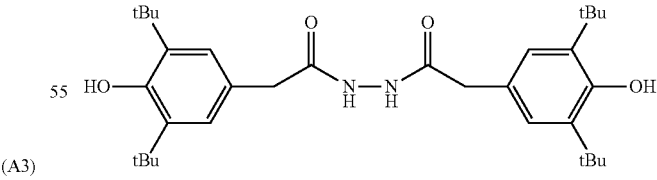

(B2)

N,N'-bis[3-(3,5-ditertiarybutyl-4-hydroxyphenyl)propionyl]hydrazine

[Blending Ratio]

The resin composition normally contains 4 to 8 parts by mass, preferably, 4 to 6 parts by mass of the phenol-based antioxidant with respect to 100 parts by mass of polypropylene. Note that, when the phenol-based antioxidants of a plurality of kinds are blended, the content amount of the phenol-based antioxidant is regarded as the content amount being the total amount of the phenol-based antioxidants of the plurality of kinds. The content amount of the phenol-based antioxidant preferably falls within the range to described above because heat resistant life of the insulator 30 is prolonged.

The resin composition main contain an antioxidant other than the phenol-based antioxidant, for example, the sulfur-based antioxidant and the phosphite-based antioxidant by an amount not limited to the content amount of the phenol-based antioxidant described above.

The resin composition normally contains 1 to 3 parts by mass of the sulfur-based antioxidant with respect to 100 parts by mass of polypropylene. The content amount of the sulfur-based antioxidant preferably falls within the range described above because heat resistant life of the insulator 30 is prolonged.

The resin composition normally contains 0.05 to 0.15 parts by mass of the phosphite-based antioxidant with respect to 100 parts by mass of polypropylene. The content amount of the phosphite-based antioxidant preferably falls within the range described above because heat resistant life of the insulator 30 is prolonged.

The resin composition normally contains 0.5 to 3.0 parts by mass, preferably, 1.0 to 3.0 parts by mass of the copper inhibitor with respect to 100 parts by mass of polypropylene. The content amount of the copper inhibitor preferably falls within the range described above because heat resistant life of the insulator 30 is prolonged.

The resin composition contains 4 to 8 parts by mass of the phenol-based antioxidant and 1.0 to 3.0 parts by mass of the copper inhibitor with respect to 100 parts by mass of polypropylene. The content amounts of the phenol-based antioxidant and the copper inhibitor preferably fall within the ranges described above because a dielectric dissipation factor of the insulator 30 is suppressed to be low and heat resistant life of the insulator 30 is prolonged.

The resin composition can be produced by a publicly-known method. Further, the insulator 30 may be produced through use of the resin composition by a publicly-known method.

[Relative Dielectric Constant of Insulator]

The insulator 30 has a relative dielectric constant of 2.0 to 2.5, preferably, 2.2 to 2.4 when an electric field having a frequency of 1 GHz is applied. Note that the relative dielectric constant is a value calculated by the cavity resonator method. Specifically, the relative dielectric constant is a value calculated based on a resonance frequency and a Q value that are measured by using a cavity resonator of 1 GHz in conformity with JIS C2565 and inserting the insulator 30 into the cavity resonator at an ambient temperature of 25° C. The relative dielectric constant preferably falls within the range described above because a transmission loss in the twisted pair cable 1 is reduced.

[Dielectric Dissipation Factor of Insulator]

The insulator 30 has a dielectric dissipation factor of $1.0 \times 10^{-3}$ or less when an electric field having a frequency of 1 GHz is applied. Note that the dielectric dissipation factor is a value calculated by the cavity resonator method. Specifically, the dielectric dissipation factor is a value calculated based on a resonance frequency and a Q value that are measured by using the cavity resonator of 1 GHz in conformity with JIS C2565 and inserting the insulator 30 into the cavity resonator at an ambient temperature of 25° C. The dielectric dissipation factor preferably falls within the range described above because a transmission loss in the twisted pair cable 1 is reduced.

In general, it is demanded that an unshielded twisted pair cable (J-UTP) for 100 Mbps have a value of −0.45 dB/m or less at 66 MHz. Thus, it is desired that a dielectric dissipation factor of the insulator 30 be $1.0 \times 10^{-3}$ or less.

[Compatibility with PVC of Insulator]

The insulator 30 has an external appearance abnormality development time exceeding 3,000 hours, preferably, 10,000 hours during a test of compatibility with PVC in contact with PVC at 100° C.

Here, the test of compatibility with PVC indicates a test in which a compatibility with PVC measurement sample is used and change in external appearance of the insulator 30 of the electric wire 10 is observed at 100° C. The compatibility with PVC measurement sample is obtained by bundling one electric wire 10 and six PVC-covered electric wires brought into close contact to cover the periphery of the electric wire 10. Specifically, the test of compatibility with PVC indicates a test in which the sample described above is placed in an atmosphere at 100° C. and change in external appearance of the insulator 30 of the sample is visually observed after a predetermined time elapses.

Figure 3:
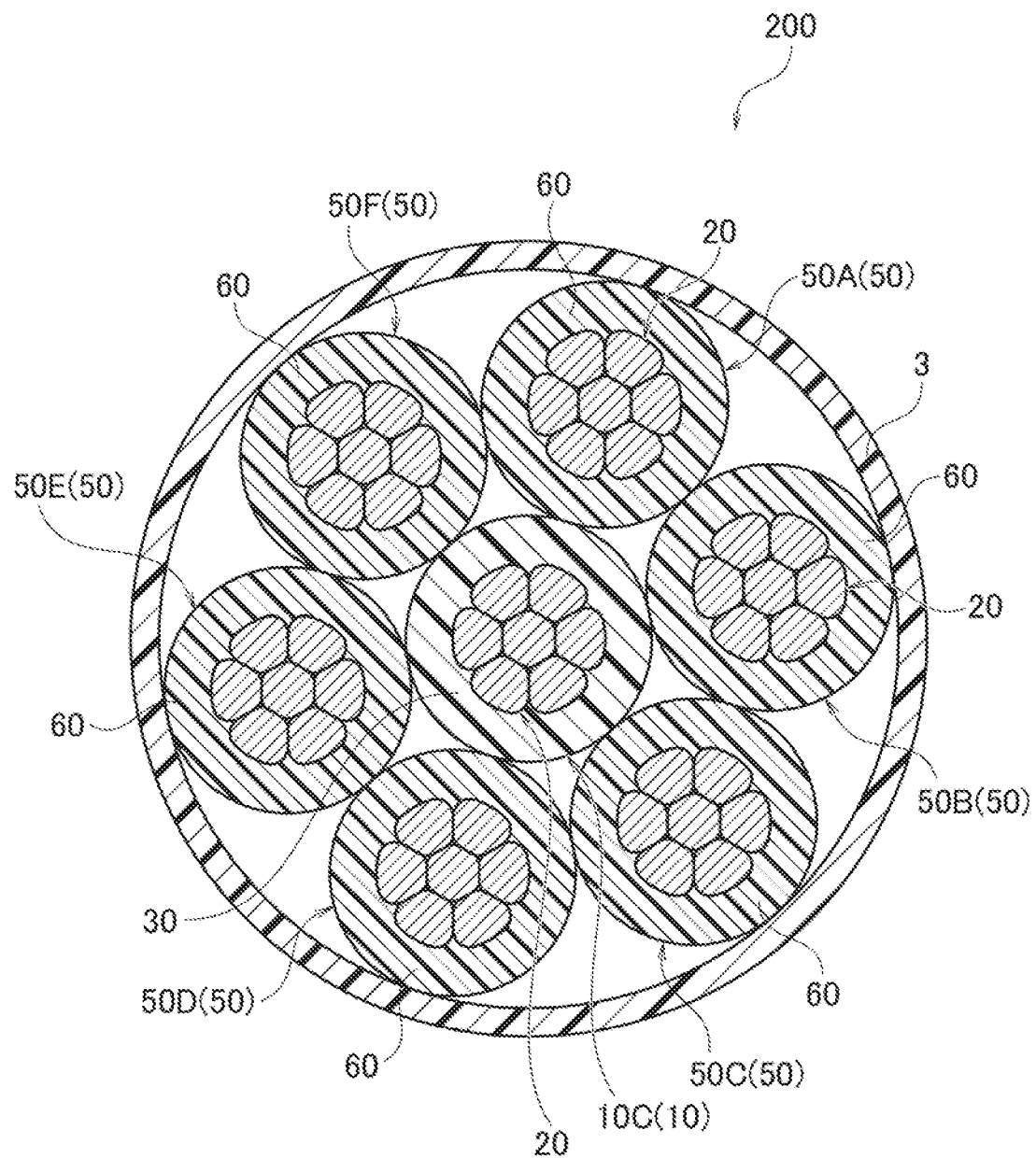
FIG. 3 is a cross-sectional view of a compatibility with PVC measurement sample for measuring compatibility with PVC.

FIG. 3 is a cross-sectional view of the compatibility with PVC measurement sample for measuring compatibility with PVC. As illustrated in FIG. 3, a compatibility with PVC measurement sample 200 is obtained by bundling, with a PVC tape 3, one electric wire 10C, which is given for observing change in external appearance of the insulator 30, and six PVC-covered electric wires 50 brought into close contact to cover the periphery of the electric wire 10C.

Note that the electric wire 10C and the PVC-covered electric wires 50 (50A, 50B, 50C, 50D, 50E, 50F) are similar except that a material of the insulator 30 of the electric wire 10C and a material of PVC insulator 60 of the PVC-covered electric wires 50 are different from each other.

Specifically, the electric wire 10C of the compatibility with PVC measurement sample 200 includes the conductor portion 20 of 0.13 sq, which is a twisted wire of seven single wire conductors each being made of a copper alloy, and the insulator 30 having a thickness of 0.18 mm to 0.22 mm, which is formed by extrusion molding and covers the outer periphery of the conductor portion 20. Further, the PVC-covered electric wires 50 of the compatibility with PVC measurement sample 200 includes the conductor portion 20 of 0.13 sq, which has a similar configuration to that of the electric wire 10C, and the PVC insulator 60, which covers the outer periphery of the conductor portion 20 and is made of polyvinyl chloride having a thickness of 0.2 mm.

Further, specifically, a VTA tape (thickness of 0.135 mm, width of 19 mm) produced by YAZAKI Corporation is used as the PVC tape 3 of the compatibility with PVC measurement sample 200. Further, the VTA tape is wound in a half-lap state, and the electric wire 10C and the PVC-covered electric wires 50 are bundled. In this manner, the compatibility with PVC measurement sample 200 is produced.

In the test of compatibility with PVC, a plurality of compatibility with PVC measurement samples 200 are left in an oven in an atmosphere at 100° C., and each of the compatibility with. PVC measurement samples 200 is taken out after the elapse of 1,000 hours, 2,000 hours, and 3,000 hours. Subsequently, the compatibility with PVC measurement sample 200 is disassembled, the electric wire 10C is taken out, and the electric wire 10C is wound by a half round along a circumferential direction of a self-diameter mandrel. Here, the self-diameter mandrel refers to a mandrel having the same diameter as that of the electric wire 10C. The length of the electric wire 10C on the outer circumferential side, which is wound around the self-diameter mandrel, is extended 1.5 times with respect to the length of the center part of the electric wire 10C.

In the test of compatibility with PVC, the insulator 30 of the electric wire 10C wound around the self-diameter mandrel is visually observed to determine presence or absence of external appearance abnormality such as a crack, a flaw, and exposure of the conductor. A time required for observing external appearance abnormality is referred to as an external appearance abnormality development time.

For the insulator 30 of the twisted pair cable 1, the external appearance abnormality development time in the test of compatibility with PVC described above preferably falls within the range described above because the twisted pair cable 1 including the insulator having long. heat resistant life even in contact with PVC can be obtained.

(Effect)

According to the twisted pair cable 1, there can be obtained the twisted pair cable including the insulator, the insulator having a low dielectric constant, a low dielectric dissipation factor and long heat resistant life even in contact with PVC.

[Cable]

Figure 2:
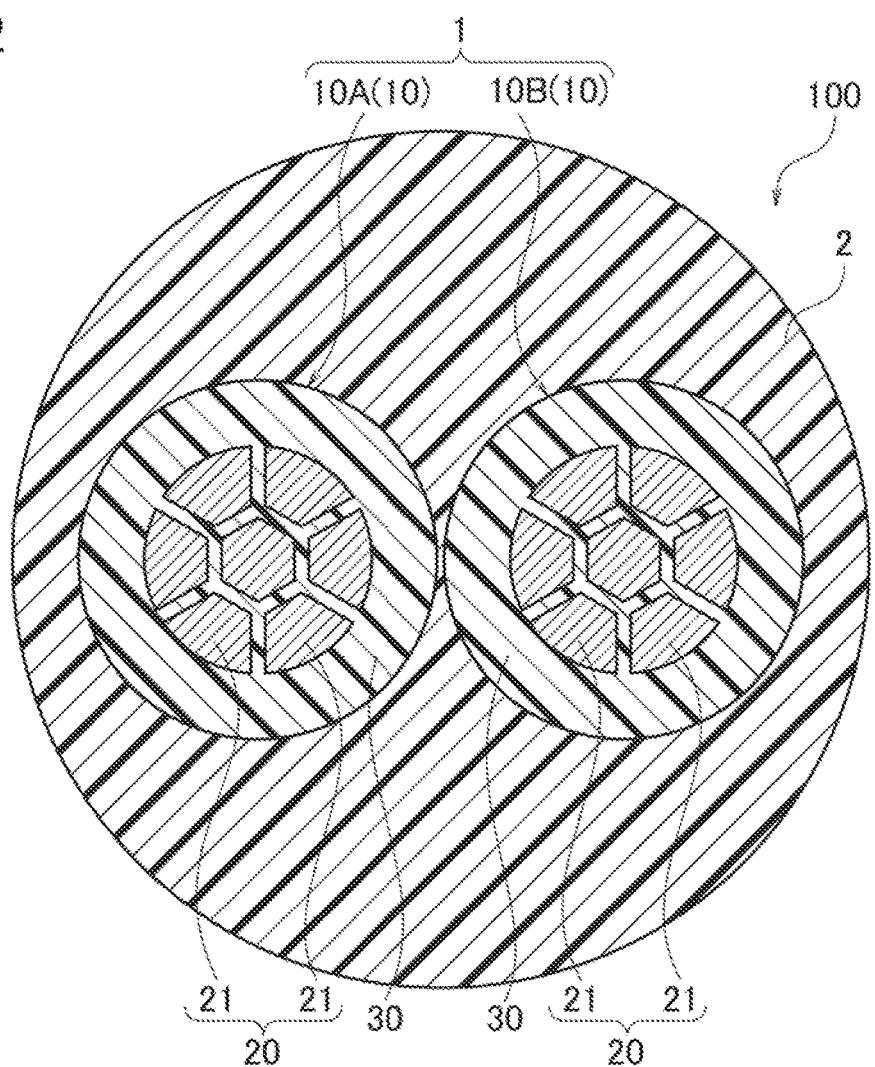
FIG. 2 is a cross-sectional view of a cable according to an embodiment.

FIG. 2 is a cross-sectional view of a cable according to an embodiment.

As illustrated in FIG. 2, a cable 100 includes the twisted pair cable 1 and a sheath 2 covering the twisted pair cable 1. The twisted pair cable 1 is similar to the twisted pair cable 1 illustrated in FIG. 1. Thus, description on the twisted pair cable 1 is omitted, and the sheath 2 is described.

(Sheath)

The sheath 2 is a member for covering the twisted pair cable 1. The sheath 2 protects the twisted pair cable 1. The sheath 2 is made of a polyolefin resin composition.

As illustrated in FIG. 2, in the cable 100, the sheath 2 has a structure in which a cross-section of the sheath 2 has a circular contour and the periphery of the twisted pair cables 1, 1 is covered snugly. Specifically, the sheath 2 has a filling structure. Note that, in a modification example of the cable 100, the cable may include a sheath having a tubular structure instead of the tilling structure. Specifically, the cable may include a sheath having a tubular structure and the twisted pair cables 1, 1 accommodated in the sheath so as to have a clearance with an inner wall surface of the sheath.

<Polyolefin Resin Composition>

As the polyolefin resin composition, for example, polypropylene, polyethylene, a polypropylene-polyethylene copolymer, or a thermoplastic elastomer is used.

(Effect)

According to the cable 100, there can be obtained the cable having a low dielectric constant, a low dielectric dissipation factor and long heat resistant life even in contact with PVC.

EXAMPLES

The present embodiment is further described below in detail with reference to Examples and Comparative Examples. However, the present embodiment is not limited to Examples.

The materials used in Examples and Comparative Examples are as follows.

homo polypropylene: E100GV (produced by Prime Polymer Co., Ltd.)
block polypropylene: E150GK (produced by Prime Polymer Co., Ltd.)

a phenol-based antioxidant: AO-20 (produced by ADEKA Corporation)
a phenol-based antioxidant: AO-60 (produced by ADEKA Corporation)
a sulfur-based antioxidant: DSTP (produced by Mitsubishi Chemical Corporation)
a phosphite-based antioxidant: ADK STAB 2112 (produced by ADEKA Corporation)
a hydrazine-based copper inhibitor: CDA-10 (produced by ADEKA Corporation)
a salicylic acid-based copper inhibitor: CDA-1 (produced by ADEKA Corporation)

Example 1

(Production of Electric Wire)

The electric wire 10 constituting the twisted pair cable 1 illustrated in FIG. 1 was produced. Specifically, the electric wire 10C constituting the compatibility with PVC measurement sample 200 illustrated in FIG. 3 was produced. The electric wire 10C included the conductor portion 20 of 0.13 sq, which was a twisted wire of seven single wire conductors each being made of a copper alloy, and the insulator 30 having a thickness of 0.2 mm, which covered the outer periphery of the conductor portion 20. The resin composition of the insulator 30 was a composition as shown in Table 1.

(Evaluation)

<Relative Dielectric Constant of Insulator>

The relative dielectric constant of the insulator 30 was calculated based on a resonance frequency and a Q value that were measured by using a cavity resonator of 1 GHz in conformity with JIS C2565 and inserting the insulator 30 into the cavity resonator at an ambient temperature of 25° C.

The results are shown in Table 1. Note that, when the relative dielectric constant≤2.5 was satisfied, evaluation was given as "satisfactory". When the relative dielectric constant>2.5 is satisfied, evaluation was given as "poor". Note that Table 1 shows total evaluation given in combination of evaluation on the relative dielectric constant and evaluation on a dielectric dissipation factor described later. When the evaluation on the relative dielectric constant and the evaluation on the dielectric dissipation factor were both "satisfactory", the total evaluation was given as "○ (satisfactory)". Further, when either one or both of the evaluation on the relative dielectric constant and the evaluation of the dielectric dissipation factor were "poor", the total evaluation was given as "× (poor)".

<Dielectric Dissipation Factor of Insulator>

The dielectric dissipation factor of the insulator 30 was calculated based on a resonance frequency and a Q value that were measured by using a cavity resonator of 1 GHz in conformity with JIS C2565 and inserting the insulator 30 into the cavity resonator at an ambient temperature of 25° C.

The results are shown in Table 1. Note that when the dielectric dissipation factor≤$1.0 \times 10^{-3}$ is satisfied, evaluation was given as "satisfactory". When the dielectric dissipation factor>$1.0 \times 10^{-3}$ is satisfied, evaluation was given as "poor".

<Test of Compatibility with PVC of Insulator>

[Production of Compatibility with PVC Measurement Sample]

First, the compatibility with PVC measurement sample illustrated in FIG. 3 was produced. The compatibility with PVC measurement sample 200 was obtained by bundling, with the PVC tape 3, one electric wire 10C, which was given for observing change in external appearance of the insulator 30, and six PVC-covered electric wires 50 brought into dose contact to cover the periphery of the electric wire 10C.

Specifically, the electric wire 10C of the compatibility with PVC measurement sample 200 was formed so as to include the conductor portion 20 of 0.13 sq, which was a twisted wire of seven single wire conductors each being made of a copper alloy, and the insulator 30 having a thickness of 0.18 mm to 0.22 mm, which was formed by extrusion molding and covers the outer periphery of the conductor portion 20. Further, the PVC-covered electric wires 50 of the compatibility with PVC measurement sample 200 is formed so as to include the conductor portion 20 a 0.13 sq, which had a similar configuration to that of the electric wire 10C, and the PVC insulator 60, which covered the outer periphery of the conductor portion 20 and was made of polyvinyl chloride having a thickness of 0.2 mm.

Further, the VTA tape (thickness of 0.135 mm, width of 19 mm) produced by YAZAKI Corporation was used as the PVC tape 3 of the compatibility with PVC measurement sample 200. Further, the VTA tape was wound in a half-lap state, and the electric wire 10C and the PVC-covered electric wires 50 were bundled. In this manner, the compatibility with PVC measurement sample 200 was produced.

[Measurement of Compatibility with PVC]

A plurality of compatibility with PVC measurement samples 200 were left in an oven in an atmosphere at 100° C. and each of the compatibility with PVC measurement samples 200 was taken out after the elapse of 1,000 hours, 2,000 hours, and 3,000 hours. Subsequently, the compatibility with PVC measurement sample 200 was disassembled, the electric wire 10C was taken out, and the electric wire 10C was wound by a half round along a circumferential direction of a self-diameter mandrel. Here, the self-diameter mandrel referred to a mandrel having the same diameter as that of the electric wire 10C. The length of the electric wire 10C on the outer circumferential side, which was wound around the self-diameter mandrel, was extended 1.5 times with respect to the length of the center part of the electric wire 10C.

The insulator 30 of the electric wire 10C wound around the self-diameter mandrel was visually observed to determine presence or absence of external appearance abnormality such as a crack, a flaw, and exposure of the conductor. A time required for observing external appearance abnormality was referred to as an external appearance abnormality development time.

The results are shown in Table 1. Note that, when no external appearance abnormality such as a crack, a flaw, and exposure of the conductor was confirmed for all the compatibility with PVC measurement samples 200 after the elapse of 1,000 hours, 2,000 hours, and 3,000 hours, evaluation was given as "○ (satisfactory)". Further, when external appearance abnormality such as a crack, a flaw, and exposure of the conductor was confirmed for at least one of the compatibility with PVC measurement samples 200 after the elapse of 1,000 hours, 2,000 hours, and 3,000 hours, evaluation was given as "× (poor)".

TABLE 1

|  |  |  | Test example No. | | | | | | |
|---|---|---|---|---|---|---|---|---|---|
|  |  |  | Example 1 | Example 2 | Example 3 | Example 4 | Example 5 | Example 6 | Example 7 |
| Blending amount (part by mass) | Homo polypropylene | E100GV | — | — | — | — | — | — | — |
|  | Block polypropylene | E150GK | 100 | 100 | 100 | 100 | 100 | 100 | 100 |
|  | Phenol-based antioxidant | AO-20 | 8 | 8 | — | — | — | 2 | 2 |
|  |  | AO-60 | — | — | 8 | 8 | 4 | 2 | 4 |
|  | Sulfur-based antioxidant | DSTP | — | — | — | — | — | — | — |
|  | Phosphite-based antioxidant | ADK STAB 2112 | — | — | — | — | — | — | — |
|  | Hydrazine-based copper inhibitor | CDA-10 | 3 | — | 3 | — | 1 | 1 | — |
|  | Salicylic acid-based copper inhibitor | CDA-1 | — | 3 | — | 3 | 2 | — | 1 |
| Evaluation | Crack in insulator in test of compatibility with PVC | 1000 h | Absent | Absent | Absent | Absent | Absent | Absent | Absent |
|  |  | 2000 h | Absent | Absent | Absent | Absent | Absent | Absent | Absent |
|  |  | 3000 h | Absent | Absent | Absent | Absent | Absent | Absent | Absent |
|  |  | Determination | ○ Satisfactory | ○ Satisfactory | ○ Satisfactory | ○ Satisfactory | ○ Satisfactory | ○ Satisfactory | ○ Satisfactory |
|  | Dielectric characteristics | Relative dielectric constant | 2.30 | 2.35 | 2.31 | 2.34 | 2.28 | 2.31 | 2.28 |
|  |  | Dielectric dissipation factor | $9.21 \times 10^{-4}$ | $9.36 \times 10^{-4}$ | $9.05 \times 10^{-4}$ | $7.71 \times 10^{-4}$ | $8.04 \times 10^{-4}$ | $6.62 \times 10^{-4}$ | $8.38 \times 10^{-4}$ |
|  |  | Determination | ○ Satisfactory | ○ Satisfactory | ○ Satisfactory | ○ Satisfactory | ○ Satisfactory | ○ Satisfactory | ○ Satisfactory |

Examples 2 to 16 and Comparative Examples 1 to 10

The electric wire 10C was produced and evaluated similarly in Example 1 except that the resin composition of the insulator 30 was changed to compositions shown in Table 1 to Table 4.

The results are shown in Table 1 to Table 4.

TABLE 2

| | | | Test example No. | | | | | |
|---|---|---|---|---|---|---|---|---|
| | | | Example 8 | Example 9 | Example 10 | Example 11 | Example 12 | Example 13 |
| Blending amount (part by mass) | Homo polypropylene | E100GV | — | — | — | — | — | — |
| | Block polypropylene | E150GK | 100 | 100 | 100 | 100 | 100 | 100 |
| | Phenol-based antioxidant | AO-20 | 4 | 4 | — | 8 | 4 | — |
| | | AO-60 | — | 2 | 4 | — | — | 4 |
| | Sulfur-based antioxidant | DSTP | — | — | — | — | — | — |
| | Phosphite-based antioxidant | ADK STAB 2112 | — | — | — | — | — | — |
| | Hydrazine-based copper inhibitor | CDA-10 | 1 | — | 2.5 | — | — | — |
| | Salicylic acid-based copper inhibitor | CDA-1 | 1 | 2 | 0.5 | 1 | 1 | 1 |
| Evaluation | Crack in insulator in test of compatibility with PVC | 1000 h | Absent | Absent | Absent | Absent | Absent | Absent |
| | | 2000 h | Absent | Absent | Absent | Absent | Absent | Absent |
| | | 3000 h | Absent | Absent | Absent | Absent | Absent | Absent |
| | | Determination | ○ Satisfactory | ○ Satisfactory | ○ Satisfactory | ○ Satisfactory | ○ Satisfactory | ○ Satisfactory |
| | Dielectric characteristics | Relative dielectric constant | 2.28 | 2.31 | 2.31 | 2.30 | 2.27 | 2.27 |
| | | Dielectric dissipation factor | $5.04 \times 10^{-4}$ | $5.93 \times 10^{-4}$ | $7.44 \times 10^{-4}$ | $9.53 \times 10^{-4}$ | $7.38 \times 10^{-4}$ | $7.37 \times 10^{-4}$ |
| | | Determination | ○ Satisfactory | ○ Satisfactory | ○ Satisfactory | ○ Satisfactory | ○ Satisfactory | ○ Satisfactory |

TABLE 3

| | | | Test example No. | | | | | | |
|---|---|---|---|---|---|---|---|---|---|
| | | | Example 14 | Example 15 | Example 16 | Comparative Example 1 | Comparative Example 2 | Comparative Example 3 | Comparative Example 4 |
| Blending amount (part by mass) | Homo polypropylene | E100GV | 100 | 100 | — | — | — | — | — |
| | Block polypropylene | E150GK | — | — | 100 | 100 | 100 | 100 | 100 |
| | Phenol-based antioxidant | AO-20 | 4 | 4 | 4 | 10 | 10 | — | — |
| | | AO-60 | — | — | — | — | — | 10 | 10 |
| | Sulfur-based antioxidant | DSTP | 2 | 2 | 2 | — | — | — | — |
| | Phosphite-based antioxidant | ADK STAB 2112 | 0.1 | 0.1 | 0.1 | — | — | — | — |
| | Hydrazine-based copper inhibitor | CDA-10 | — | — | — | 3 | — | 3 | — |
| | Salicylic acid-based copper inhibitor | CDA-1 | 1 | 1 | 1 | — | 3 | — | 3 |
| Evaluation | Crack in insulator in test of compatibility with PVC | 1000 h | Absent | Absent | Absent | Absent | Absent | Absent | Absent |
| | | 2000 h | Absent | Absent | Absent | Absent | Absent | Absent | Absent |
| | | 3000 h | Absent | Absent | Absent | Absent | Absent | Absent | Absent |
| | | Determination | ○ Satisfactory | ○ Satisfactory | ○ Satisfactory | ○ Satisfactory | ○ Satisfactory | ○ Satisfactory | ○ Satisfactory |

TABLE 3-continued

|  |  | Example 14 | Example 15 | Example 16 | Comparative Example 1 | Comparative Example 2 | Comparative Example 3 | Comparative Example 4 |
|---|---|---|---|---|---|---|---|---|
| Dielectric characteristics | Relative dielectric constant | 2.33 | 2.32 | 2.31 | 2.38 | 2.38 | 2.31 | 2.30 |
|  | Dielectric dissipation factor | $7.75 \times 10^{-4}$ | $8.00 \times 10^{-4}$ | $8.32 \times 10^{-4}$ | $1.24 \times 10^{-2}$ | $1.12 \times 10^{-3}$ | $1.19 \times 10^{-3}$ | $1.05 \times 10^{-3}$ |
|  | Determination | ○ Satisfactory | ○ Satisfactory | ○ Satisfactory | x Poor | x Poor | x Poor | x Poor |

TABLE 4

|  |  |  | Comparative Example 5 | Comparative Example 6 | Comparative Example 7 | Comparative Example 8 | Comparative Example 9 | Comparative Example 10 |
|---|---|---|---|---|---|---|---|---|
| Blending amount (part by mass) | Homo polypropylene | E100GV | — | — | — | — | — | — |
|  | Block polypropylene | E150GK | 100 | 100 | 100 | 100 | 100 | 100 |
|  | Phenol-based antioxidant | AO-20 | — | 2 | — | 4 | — | — |
|  |  | AO-60 | 2 | — | 4 | — | — | — |
|  | Sulfur-based antioxidant | DSTP | — | — | — | — | 4 | — |
|  | Phosphite-based antioxidant | ADK STAB 2112 | — | — | — | — | — | 0.5 |
|  | Hydrazine-based copper inhibitor | CDA-10 | 0.5 | 0.5 | — | — | — | — |
|  | Salicylic acid-based copper inhibitor | CDA-1 | 1 | 2 | 0.5 | 0.5 | — | — |
| Evaluation | Crack in insulator in test of compatibility with PVC | 1000 h | Absent | Absent | Absent | Absent | Present | Present |
|  |  | 2000 h | Present | Absent | Absent | Absent | Present | Present |
|  |  | 3000 h | Present | Present | Present | Present | Present | Present |
|  |  | Determination | x Poor | x Poor | x Poor | x Poor | x Poor | x Poor |
|  | Dielectric characteristics | Relative dielectric constant | 2.28 | 2.30 | 2.27 | 2.27 | 2.28 | 2.26 |
|  |  | Dielectric dissipation factor | $4.82 \times 10^{-4}$ | $4.88 \times 10^{-4}$ | $7.04 \times 10^{-4}$ | $7.38 \times 10^{-4}$ | $3.01 \times 10^{-4}$ | $1.94 \times 10^{-4}$ |
|  |  | Determination | ○ Satisfactory | ○ Satisfactory | ○ Satisfactory | ○ Satisfactory | ○ Satisfactory | ○ Satisfactory |

As shown in Table 1 to Table 4, it is understood that the relative dielectric constant and the dielectric dissipation factor are low and that compatibility with PVC is satisfactory in a case where the resin composition of the insulator "contains 4 to 8 parts by mass of the phenol-based antioxidant and 1.0 to 3.0 parts by mass of the copper inhibitor with respect to 100 parts by mass of polypropylene". Meanwhile, it is understood that either one or both of the relative dielectric constant and the dielectric dissipation factor are high or that compatibility with PVC is not satisfactory in a case where the resin composition of the insulator does not satisfy the condition described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A twisted pair cable being obtained by twisting two electric wires each of which includes a conductor portion and an insulator covering an outer periphery of the conductor portion, wherein
    the insulator is made of a resin composition containing polypropylene, an antioxidant, and a hydrazine-based copper inhibitor,
    the resin composition contains 6 to 8 parts by mass of a phenol-based antioxidant, 0.05 to 0.15 parts by mass of a phosphite-based antioxidant and 1.0 to 3.0 parts by mass of the hydrazine-based copper inhibitor with respect to 100 parts by mass of polypropylene,
    the insulator has an external appearance abnormality development time exceeding 3,000 hours during a test of compatibility with PVC in contact with PVC at 100° C., and the insulator has a relative dielectric constant of 2.0 to 2.5 and a dielectric dissipation factor of $1.0 \times 10^{-3}$ or less when an electric field having a frequency of 1 GHz is applied.

2. A cable, comprising:

the twisted pair cable according to claim 1; and a sheath covering the twisted pair cable, wherein the sheath is made of a polyolefin resin composition.

\* \* \* \* \*